United States Patent [19]

Kurek et al.

[11] Patent Number: 5,705,078
[45] Date of Patent: Jan. 6, 1998

[54] OXIDATIVE REMOVAL OF AQUEOUS CYANIDE BY MANGANESE(IV)-CONTAINING OXIDES

[75] Inventors: Paul R. Kurek, Barrington; Tom N. Kalnes, La Grange; Gregory John Lewis, Mt. Prospect, all of Ill.

[73] Assignee: UOP, Des Plaines, Ill.

[21] Appl. No.: 707,985

[22] Filed: Aug. 23, 1996

[51] Int. Cl.[6] .................................. C02F 1/72
[52] U.S. Cl. .................. 210/759; 210/760; 210/762; 210/763; 210/904; 502/208
[58] Field of Search ................... 210/759, 760, 210/758, 762, 763, 904, 908; 502/208

[56] References Cited

U.S. PATENT DOCUMENTS

| | | | |
|---|---|---|---|
| 3,442,802 | 5/1969 | Hamilton | 210/763 |
| 4,537,686 | 8/1985 | Borbely et al. | 210/713 |
| 5,120,453 | 6/1992 | Frame et al. | 210/759 |
| 5,154,836 | 10/1992 | Clough | 210/763 |
| 5,204,008 | 4/1993 | Diehl et al. | 210/759 |
| 5,238,581 | 8/1993 | Frame et al. | 210/748 |
| 5,273,663 | 12/1993 | Kurek et al. | 210/748 |
| 5,340,562 | 8/1994 | O'Young et al. | 423/599 |
| 5,360,552 | 11/1994 | Yan | 210/762 |
| 5,376,285 | 12/1994 | Kurek et al. | 210/759 |
| 5,523,509 | 6/1996 | O'Young et al. | 585/640 |
| 5,552,063 | 9/1996 | Yan | 210/763 |

FOREIGN PATENT DOCUMENTS

| | | |
|---|---|---|
| 4018466 | 2/1979 | Japan. |
| 8034083 | 2/1983 | Japan. |
| 1000491 | 1/1986 | Japan. |
| 3291689 | 5/1987 | Japan. |
| 3291690 | 5/1987 | Japan. |
| 8034083 | 11/1988 | Japan. |

OTHER PUBLICATIONS

Chen et al. (Paper 81c presented at the 1990 AIChE Summer National Meeting, San Diego, California, Aug. 21, 1990).

R. Gierzatowicz et al., *Effluent and Water Treatment Journal*, 25, 26–31 (1986).

J. Fatiadi, *Synthesis*, Feb., 1976, pp. 65 et ff.

*Primary Examiner*—Peter A. Hruskoci
*Attorney, Agent, or Firm*—Thomas K. McBride; Eugene I. Snyder

[57] ABSTRACT

Manganese(IV)-containing oxides are effective catalysts for oxidation of water-soluble cyanide over a wide pH range (0.5–12) and temperature (15°–250° C.). Oxygen is the preferred oxidizing agent at partial pressures between about 0.2 and 5 atmospheres (2.9–75 psi, 20–517 kPa). Electrolytically deposited $MnO_2$ is one preferred form of the catalyst. Another preferred manganese(IV)-containing oxide is the group of cation-stabilized manganese(IV)-containing oxides illustrated by cryptomelane. Yet another preferred form of manganese(IV)-containing oxide is a group of crystalline manganese phosphate compositions having an extended network and an empirical composition on an anhydrous basis expressed by an empirical formula of:

$$(A^{a+})_v(Mn^{b+})(M^{c+})_xP_yO_z$$

where A is a templating agent selected from the group consisting of alkali metals, alkaline earth metals, hydronium ion, ammonium ion, organoammonium ions, and mixtures thereof, "a" represents a weighted average valence of A and varies from 1.0 to 2.0, "v" is the mole ratio of A to Mn and varies from about 0.1 to about 5, "b" is the average valence of Mn and has a value of greater than 3 to about 4, M is a metal selected from the group consisting of Al, $Fe^{3+}$, Ca, $Sn^{4+}$, Ti, $Sb^{5+}$, and mixtures thereof, "x" is the mole ratio of M to Mn and varies from 0 to about 3.0, "c" is the weighted average valence of M and varies from about 1.0 to about 5.0, "y" is the mole ratio of P to Mn and varies from about 0.10 to about 5.0 and "z" is the mole ratio of O to Mn and has a value determined by the equation $$z=\tfrac{1}{2}(a \times v + b + x \times c + 5 \times y).$$

11 Claims, No Drawings

OXIDATIVE REMOVAL OF AQUEOUS CYANIDE BY MANGANESE(IV)-CONTAINING OXIDES

BACKGROUND OF THE INVENTION

It is only in relatively recent years that society has appreciated the impact and consequences of the fact that we live in a closed ecological system. With an increase in human population and, perhaps more importantly, an increase in industrial activity the effects of ecological changes have become more apparent. One area which has received a great deal of attention is that of water quality, which may be the result of the belated recognition that not only is water of a suitable quality for human consumption a limited resource, but that good water quality is an important, if not critical, factor in the ecological chain. Consequently attention has turned not only to purification of water in local water supplies, but alto to limiting the discharge of materials into streams and aquifers generally.

The classes of noxious materials (pollutants) in aqueous discharges vary over an enormously broad spectrum. Among the inorganic pollutants those toxic to a broad spectrum of biological species are especially dangerous. Although heavy metals such as lead, cadmium, and arsenic often are the first culprits thought of, inorganic water soluble cyanide is in a comparably dangerous class because of the generally low tolerance of life forms to cyanide.

The sources of cyanide are many and varied and include iron and steel manufacturing, petroleum and coal pyrolysis processes, the photographic, chemicals, and pharmaceutical industries, precious metal mining and metal finishing, including electroplating and galvanizing. For example, cyanide arises in iron and steel manufacture by reduction of carbonate in the presence of carbon and nitrogen. In power plants coal burning may afford coke oven gas with a hydrogen cyanide concentration on the order of 2 grams per liter. Cyanide solutions are an important component of electroplating and galvanizing, and wash water streams resulting from post-coating treatment often contain significant quantities of cyanide. The widespread prevalence of cyanide in industrial effluents coupled with their near universal toxicity to life has made it imperative to minimize cyanide concentration in aqueous streams.

It appears that the most prevalent methods of cyanide removal are based on the oxidation of cyanide. See generally R. Gierzatowicz et al., *Effluent and Water Treatment Journal*, 25, 26–31 (1986). Oxidation with chlorine or hypochlorite seems to be industrially the most commonly employed method. The first stage in this oxidation is the formation of cyanogen chloride, ClCN, itself a rather toxic gas, but which is hydrolyzed at a high pH to the less toxic cyanate, CNO. Cyanate is itself hydrolyzed to carbon dioxide and ammonia at low pH, or oxidized to carbon dioxide and nitrogen at high pH. Another oxidative method uses peroxides such as hydrogen peroxide, Caro's acid, peracetic acid, and so on, as the oxidizing agent. The advantages of this approach vis a vis the chlorine or hypochlorite based process is the lack of toxic byproducts and the formation of environmentally neutral species from the peroxides. A disadvantage is the long reaction times necessary for adequate oxidation. However, cupric ions supposedly act as catalysts for peroxide decomposition. Other oxidizing agents based on Mn(VII) and Cr(VI) also have been used.

More recently there has been described the oxidation of both free and complexed cyanide in aqueous streams by a mixture of sulfur dioxide or alkali/alkaline earth metal sulfites (including bisulfites and metabisulfites) and air or water in the presence of a water-soluble copper(II) catalyst at a pH between 5 and 12; U.S. Pat. No. 4,537,686. [Although copper is designated as "$Cu^+$" in the issued patent, the fact that most cuprous salts are water insoluble and that Cu(I) is readily oxidized strongly suggests that Cu(II) actually was used.] Using rather high weight ratios of copper to cyanide on the order of about 0.25, final cyanide concentrations could be reduced to under 0.1 parts per million. More recently Chen et al. (Paper 81c presented at the 1990 AIChE Summer National Meeting, San Diego, Calif., Aug. 21, 1990) presented data on the oxidation with air of aqueous streams containing cyanide at 100 ppm using a soluble copper catalyst in conjunction with sodium sulfite at an optimum pH of 8 over activated carbon in a trickle bed reactor at normal pressure. Initially the copper/cyanide molar ratio was about 0.25, but since copper(II) hydroxide precipitated on the carbon surface, it was found that a copper/cyanide maintenance ratio of about 0.1 was quite adequate. Although the authors characterize the activated carbon as a catalyst, this conclusion is far from clear according to the data. Thus, although the authors showed that use of a bed of activated carbon leads to 99% removal of cyanide, beds of both a molecular sieve and glass beads were almost as effective in affording about 80% removal. The improved result with activated carbon could readily be attributed to adsorption (rather than oxidation) on the bed of activated carbon—activated carbon is known to be an excellent adsorbent—or to the differing extent of copper(II) deposition on the packed beds and its dispersion on the bed materials, or to some combination of the two. Quite recently Yan (U.S. Pat. No. 5,360,552) has described the use of Cu-exchanged zeolites in the oxidation of cyanide-containing waste waters.

A continuous method for the removal of cyanide using air or oxygen as the oxidizing agent at ambient temperatures and pressures is highly desirable. Although the foregoing references provide a start, much remains before a commercially viable system is operative. In particular, it is often desirable that the catalyst either be heterogeneous, or if homogeneous readily separable, in order to avoid contamination of the effluent by the catalyst itself as well as to minimize process cost associated with catalyst consumption. It also is desireable that the catalyst be relatively insensitive to as large a class of contaminants likely to accompany cyanide as is possible. The process should be capable of efficient operation at as low a pressure and temperature as possible in order to minimize energy requirements. Finally, it is desirable for such a process to oxidize the cyanide over a rather wide range of initial cyanide concentrations, and to have the capability of oxidizing 90% or more of the cyanide present, most preferably to carbon dioxide, and any combination of elemental nitrogen and ammonia (or ammonium ion in acidic media).

U.S. Pat. No. 5,120,453 provides a process for the oxidation of cyanide in aqueous streams where the cyanide is present as the anion, $CN^-$, and where the oxidation is performed under basic conditions. It may be noted that the cited prior art also emphasizes cyanide oxidation under basic conditions, and it also may be noted in passing that basic conditions either are a prerequisite to, or materially enhance the concentration of, cyanide ion, so that the correlation between prior art oxidation under basic conditions and the presence of cyanide ion may be a fundamental one rather than being fortuitous. The patentees of the last cited patent use as catalysts a broad class of metal chelates which can be used either in a soluble or water-insoluble form to afford the opportunity of either a homogeneous or heterogeneous process. The oxidation products were largely carbon dioxide and nitrogen along with varying amounts of cyanate. The previously cited U.S. Pat. No. 5,360,552 provides a continuous process for cyanide oxidation in the presence of ammonia.

A more challenging task is the oxidation of metal complexed cyanides whose stability constant is so high that they dissociate only to a negligible extent and therefore, for all practical purposes, furnish no measurable amount of free cyanide ion. U.S. Pat. No. 5,238,581 provided one type of solution to this task by ultraviolet irradiation of the aqueous complexed cyanide to promote its dissociation to free cyanide which, in turn, could be readily oxidized.

U.S. Pat. No. 5,273,663 describes the unexpected oxidation of inorganic cyanides under acidic conditions. More recently, U.S. Pat. No. 5,376,285 described the oxidation of metal complexed cyanides under similar conditions. It is well known that the cyanide ion complexes strongly with many metals to form stable complexes, e.g., ferrocyanides, whose dissociation constant is so small that the attending minuscule concentration of free cyanide ion is insufficient for any practical oxidation. This last-cited patent overcame the remaining obstacle to oxidation of inorganic cyanides in aqueous streams.

Because manganese dioxide is known to be an effective catalyst in the oxidation of VOCs it was believed that it might offer promise in the catalytic oxidation of cyanide and therefore could be used as an addition to the arsenal of catalysts currently available for waste water treatment. See J. Fatiadi, *Synthesis*, February, 1976, pp 65 et ff for a discussion of "active" manganese dioxide as a catalyst in the oxidation of various organic classes. JP 54018466 used manganese dioxide, inter alia, to hydrolyze HCN in a gas stream using steam at 200°–400° C. JP 61000491 teaches boiling acidified cyanide-containing waste water to generate gaseous HCN, subsequently oxidized in air by manganese dioxide, among other materials, on an active clay carrier. JP 58034083 discloses treating waste water containing cyanide with sodium hydroxide or sulfuric acid, and then using hydrogen peroxide in the presence of an unspecified manganese catalyst to oxidize cyanide to nitrogen and bicarbonate. As an aside, under acidic conditions one would expect the latter to be as carbon dioxide. JP 63291690 relates to the oxidation in air of cyanide in waste water at a pH greater than 10 in the presence of manganese dioxide as a catalyst. JP 63291689 is similar but uses hydrogen peroxide as an oxidizing agent.

What we have determined is that manganese (IV)-containing oxides can be used effectively as a catalyst to air oxidize cyanide in waste water at temperatures between about 15° and 250° C. under acidic conditions, especially in the pH range between about 0.5 to about 8. Working at temperatures in excess of approximately 900° C. requires that the process be conducted at an overall pressure greater than 1 atmosphere, but this is not a serious limitation on our invention. Temperatures even greater than 2500° C. may be used with the benefit of increased throughput. Our process is readily incorporated into a fixed bed design, is convenient to operate, and is commercially a highly desirable one.

SUMMARY OF THE INVENTION

The purpose of this invention is to reduce cyanide concentrations in waste water by catalytically oxidizing the cyanide to environmentally acceptable products, especially nitrogen and carbon dioxide, using oxygen as the oxidant and manganese (IV)-containing oxides as the catalyst. An embodiment comprises contacting a waste water stream and air in the presence of manganese dioxide at a pH between about 2 and about 8. In a more specific embodiment the temperature may range from as low as about 20° to as high as about 150° C. In another embodiment the partial pressure of oxygen used is between about 2.9 and about 75 pounds per square inch (20–517 kPa). Other embodiments and variants will be apparent from the ensuing description.

DESCRIPTION OF THE INVENTION

The need to remove cyanide from various waste water streams has been elaborated upon above. Although various methods currently are available, there remains a need for a process which is at once sufficiently flexible to be applicable to varying concentrations of cyanide, to be capable of being adaptable to both continuous and batch processes, to be catalytic in nature, and to be capable of using oxygen as the oxidizing agent. We are especially interested in a process operating and operable under acidic conditions and at a pH up to mildly basic conditions. Our invention uses manganese (IV)-containing oxides as a catalyst and oxygen as the oxidant to effectively reduce the cyanide concentration in a wide variety of waste water streams.

Any aqueous stream containing dissolved cyanide is suitable for use in this invention. By "dissolved cyanide" is meant compounds bearing the —CN group, whether they be inorganic cyanides or the organic analogs called nitriles. This is not to say that the nature of the dissolved cyanide is immaterial; inorganic cyanides, especially those which ionize to afford cyanide ions, are more readily oxidized than those inorganic cyanides which are tightly complexed, as, for example, ferrocyanides. Thus, aqueous streams containing hydrogen cyanide or the alkali metal salts of cyanides, alkaline earth cyanides, and other cyanides, are more susceptible to oxidation than the complex cyanides. Nonetheless, even complex cyanides have a measurable dissociation constant and their oxidation may be effected by our invention, although the rate of oxidation can be expected to be much less than that of simple metal cyanides. The foregoing can be most readily understood if the oxidation proceeds most rapidly with dissociated cyanide ion, which is a working hypothesis whose veracity can not be vouched for at present. Examples of simple inorganic cyanides which are readily oxidized by the process of our invention include hydrogen cyanide, sodium cyanide, potassium cyanide, magnesium cyanide, calcium cyanide, lithium cyanide, and barium cyanide.

Any aqueous stream containing at least one metal-complexed cyanide also is suitable for use in this invention. It is well known that cyanide complexes with many metals in several oxidation states to form a dazzling number and variety of metal cyanide complexes. Such metal complexes may be found in various compilations well known to and readily available to the practitioner, and therefore need not be elaborated upon here. Exemplary of such complexes are the well known iron complexes, such as hexacyanoferrate (II) and (III), gold complexes such as dicyanoaurate (I) and tetracyanoaurate (III), silver complexes as dicyanoargentate (I), chromium complexes such as dicyanochromate (III), nickel complexes such as hexacyanonickelate (II), copper complexes as tricyanocuprate (I) and tetracyanocuprate (II). It must be recognized that the foregoing are merely exemplary and representative, and many more complexes have been documented. Exemplary of the metals in the metal-complexed cyanides are iron, chromium, nickel, copper, gold, silver, cadmium, mercury, zinc, platinum, cobalt, molybdenum, manganese, vanadium and titanium, to mention but a few metals.

The metal-complexed cyanides referred to above are characterized by having high stability constants (i.e., small degree of dissociation into cyanide) so that only a quite small fraction of the complexed cyanide becomes available as free cyanide ion. This can be exemplified by the hexacyanoferrate(II), $Fe(CN)_6^{4-}$, whose dissociation constant to $Fe(CN)_5^{3-}+CN^-$ at 20° C. is about $10^{-8.3}$. This means that at a 1 molar concentration of hexacyanoferrate (II) the cyanide concentration is about $10^{-4}$ molar, or about 0.002 percent of the total cyanide present. As another example, where the hexacyanoferrate (II) is present at a concentration of about 1 weight percent (ca. 0.05 molar) the free cyanide concentration will be about 0.003 weight percent (ca. $10^{-5}$ molar), or about 0.003 percent of the total cyanide present. In general, the metal-complexed cyanides of our invention are characterized by furnishing at 20° C. under 1 percent of the total available as free cyanide, and generally afford at 20° C. less than 0.1 percent of the total available cyanide as free cyanide.

It also has been observed that the organic analog of cyanides, viz. nitriles, also can be removed by the process of our invention. Chief among the nitriles whose disappearance is effected under our invention are the lower saturated and unsaturated alkyl nitriles, such as acetonitrile, propionitrile, butyronitrile, acrylonitrile, and so forth, although other nitriles such as 4-cyanopyridine also are removed. It is believed that our process is applicable to nitriles generally, irrespective of the nature of the organic group bearing the CN, the sole requirement being that the nitrile be dissolved in the aqueous stream. Whether the nitriles are removed by an oxidative or hydrolytic process is not known with certainty; what is known with certainty is that the disappearance or removal of dissolved nitrile is catalyzed by the species which catalyze the oxidation of inorganic cyanide.

Our invention is applicable most desirably to streams containing up to about 2000 parts per million cyanide, although it is preferably applicable to streams containing no more than about 100 ppm cyanide. Many streams contain cyanide on the order of 5 ppm, and even for these streams our invention is effective, although it is believed our process will find greatest use when the cyanide content is at least 25 ppm. However, it needs to be clearly understood that our invention may be applicable to streams containing as much as several percent cyanide, even though such streams may be an uncommon occurrence. Cyanide-laden aqueous streams include waste streams from metal plating industries, from photography laboratories, steel mills, chemicals waste streams such as arise in HCN and, e.g., acrylonitrile manufacture, and streams from the mining industry. However, the nature of the cyanide-containing streams which can be treated by the process of our invention is not particularly critical in any way since after acidification the principal cyanide remaining often is hydrogen cyanide. Yet it also must be recognized that there is considerable diversity among the streams of their source. For example, waste streams from mining generally will contain predominantly complexed metal cyanides, whereas waste streams from a chemical plant practicing hydrocyanation probably will have only alkali metal cyanides originally.

The key to our invention is the use as a catalyst of manganese(IV)-containing oxides. An example is $MnO_2$ itself, which has been demonstrated to be an oxidative catalyst for inorganic cyanides; whether it acts as an oxidative or hydrolytic catalyst for nitriles is uncertain. We have found that the use of electrolytically deposited manganese dioxide is especially effective in the practice of our invention, since the material exhibits high activity and high resistance to leaching. The variable activity of manganese dioxide in organic oxidations is well recognized; see J. Fatiadi, op. cit. Although we have found that electrolytically deposited manganese dioxide is a particularly desirable catalyst, this is not to say that other forms of manganese dioxide may not be used in the practice of our invention, although not necessarily with equivalent results.

We also have observed during continuous oxidation using electrolytically deposited gamma-$MnO_2$ its transformation into cryptomelane which remained active for the entire run. Both SEM photos and X-ray patterns confirmed the transformation into cryptomelane. Cryptomelane, $KMn_8O_{16} \cdot xH_2O$, has analogs such as hollandite ($BaMn_8O_{16} \cdot xH_2O$), manjiroite ($NaMn_8O_{16} \cdot xH_2O$), and coronadite ($PbMn_8O_{16} \cdot xH_2O$) which, like cryptomelane, also have an oxidation state somewhat lower than the +4 state as found in $MnO_2$. Analogous cation-stabilized manganese (IV)-containing oxides, as illustrated by the foregoing exemplars, also can be expected to be active oxidants in the practice of this invention and are intended to be included among the manganese (IV-containing oxides of this invention. Also, vide infra for other analogs.

We also have found other manganese(IV)-containing oxides, such as those with the pharmacosiderite structure, to be effective catalysts in our process. We have found a family of crystalline manganese phosphate compositions to be effective in our invention. These compositions have an empirical chemical composition on an anhydrous basis expressed by the formula:

$$(A^{a+})_v(Mn^{b+})(M^{c+})_x P_y O_z$$

where A is a templating agent selected from the group consisting of alkali metals, alkaline earth metals, hydronium ion, ammonium ion, organoammonium ions, and mixtures thereof; "a" represents a weighted average valence of A and varies from 1.0 to 2.0, "v" is the mole ratio of A to Mn and varies from about 0.1 to about 10, "b" is the average valence of Mn and has a value of greater than 3 to about 4, M is a metal selected from the group consisting of Al, $Fe^{a+}$, Ca, $Sn^{4+}$, Ti, $Sb^{5+}$, and mixtures thereof, "x" is the mole ratio of M to Mn and varies from 0. to about 3.0, "c" is the weighted average valence of M and varies from about 1.0 to about 5.0, "y" is the mole ratio of P to Mn and varies from about 0.10 to about 5.0 and "z" is the mole ratio of O to Mn and has a value determined by the equation

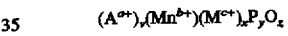

The alkali metals include lithium, sodium, potassium, rubidium and cesium, while the alkaline earth metals include magnesium, calcium, strontium and barium. Illustrative examples of organoammonium ions include but are not limited to methylaminium, ethylenediaminium, and hexylaminium.

When A is one templating agent, the weighted average valence is the valence of the one templating agent. However, when more than one templating agent is used, the total amount of

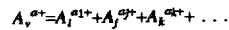

and the weighted average valance "a" is defined by $$a = \frac{a_i \cdot i + a_j \cdot j + a_k \cdot k + \ldots}{i + j + k}$$

The weighted average valence of manganese ("b") is dependent on the amount of $Mn^{3+}$ and $Mn^{4+}$ present in the composition. Thus, if the total amount of manganese "w" is defined by w=p+q, where "p" is the mole fraction $Mn^{3+}$, "q" is the mole fraction $Mn^{4+}$ then the average valence $$b = \frac{3p + 4p}{p + q}$$

Similarly, when two or more metals (M) are present, the amount of each metal is defined by $$M_x{}^{c^+} M_\alpha{}^{c\alpha+} + M_\beta{}^{c\beta+} + M_\gamma{}^{c\gamma+} + \ldots$$

and the average valence C is determined by the equation $$C = \frac{C_a \cdot a + C_\beta \cdot \beta + C_\gamma \cdot \gamma}{a + \beta + \gamma}$$

The crystalline compositions are characterized in that they have an extended network. By extended network is meant that the defining Mn—P—O structural unit of the material repeats itself into at least two adjacent unit cells without termination of bonding, i.e., the material is not molecular. See "Structural Inorganic Chemistry, Fifth Edition," A. F. Wells, Clarendon Press, Oxford, pp. 11–15, (1984). The compositions can have a one-dimensional network which is a linear chain, a two-dimensional network which is a layered network or a three-dimensional network which is either a microporous flamework structure or a non-microporous flamework structure.

The instant manganese phosphate compositions are prepared by hydrothermal crystallization of a reaction mixture prepared by combining reactive sources of phosphorus, manganese, optionally one M metal, at least one templating agent plus water. Specific examples of the phosphorus sources which can be used in this invention are orthophosphoric acid, pyrophosphoric acid, alkali phosphates and sodium metaphosphate. The manganese source can be either a high oxidation state salt such as $KMnO_4$, $NaMnO_4$, $CsMnO_4$, $NH_4MnO_4$, $Mg(MnO_4)_2$ and $Ba(MnO_4)_2$. Alternatively, the manganese source can be a combination of a high oxidation state manganese salt and a low oxidation state salt which acts as a reductant. The high oxidation state salts can be any of those enumerated above, while the low oxidation state salts include but are not limited to $Mn(NO_3)_2 \cdot 6H_2O$, $MnSO4$ $H_2O$. Manganese oxides such as $Na_4Mn_{14}O_{27} \cdot 9H_2O$ can also be used. Finally, it is preferred that a special 1 wt. % manganese solution prepared from $NaMnO_4$ and $H_3PO_4$ whose preparation is described in detail in the examples can also be used. This phosphate stabilized manganese solution has a composition represented by the empirical formula $NaMnO_4:rH_3PO_4:sR:uH_2O$ where R is a reductant selected from the group consisting of $H_2C_2O_4$, $Na_2C_2O_4$, $NaHCO_2$ and $MN(NO_3)_2 \cdot 6H_2O$, "r" has a value of about 3.0 to about 30, "s" is the mole ratio of $R:NaMnO_4$ sufficient to reduce the manganese oxidation state from greater than 3 to about 4 and varies from about 1.5 to about 4, and "u" is the moles of water and varies from about 25 to about 1000 in order to vary the manganese concentration from 0.1 wt % to about 5 wt %. The advantage to this solution is that it is stable over a large period of time, i.e., months, and facilitates the preparation of the instant compositions by adding a templating agent to this solution and heating the resultant mixture. The source of the alkali or alkaline earth metals include the halide, acetate, nitrate, carbonate, and hydroxide salts. Specific examples include sodium chloride, sodium nitrate, sodium acetate, sodium carbonate, sodium hydroxide, lithium chloride, lithium nitrate, lithium carbonate, lithium hydroxide, rubidium chloride, rubidium nitrate, rubidium carbonate, rubidium hydroxide, cesium chloride, cesium nitrate, cesium carbonate, cesium hydroxide, potassium chloride, potassium nitrate, potassium carbonate, potassium hydroxide, magnesium chloride, magnesium nitrate, magnesium carbonate, magnesium hydroxide, calcium chloride, calcium nitrate, calcium hydroxide, calcium carbonate, barium chloride, barium nitrate, barium carbonate, barium hydroxide, strontium chloride, strontium nitrate, strontium carbonate and strontium hydroxide. Sources of organoammonium ions include methylamine, hexylamine, propylamine, and ethylenediamine. The organoammonium cation is generated in situ via protonation. Finally, sources of the M metal include the nitrate salts of the metals as well as $TiCl_3$, $NaSbF_6$, and $SnCl_4$.

Generally, the hydrothermal process used to prepare the manganese phosphates described above involves forming a reaction mixture which has the formula:

$d\ AO_2:MnO_m:eMO_c:fP_2O_5:gB:hR:tH_2O$ where B is a mineralizer, P, is a reductant, "d" ranges from about 2.5 to about 20, "e" ranges from 0 to about 3.0, "f" ranges from about 1.0 to about 15, "g" ranges from 0 to about 2, "h" ranges from 0 to about 4, and "t" ranges from about 25 to about 1000, and "m" ranges from about 3 to about 7. Examples of the mineralizer B included HF and NaF, while examples of the reductant K include $NaHCO_2$, $H_2C_2O_4$, and $NaC_2O_4$.

It also is necessary to adjust the pH of the mixture to a value of about 2.0 to about 9.0. The pH of the mixture can be controlled by addition of a base such as NaOH, $NH_4OH$, amines, etc.

Having formed the reaction mixture, it is next reacted at a temperature of about 50° C. to about 125° C. for a period of about 12 hours to about 96 hours. The reaction is carried out under atmospheric pressure or the reaction vessel may be sealed and the reaction run at autogenous pressure. In a preferred method the phosphorus source is orthophosphoric acid, the manganese source is $NaMnO_4 \cdot H_2O$, the temperature is from about 70° C. to about 100° C. and the time required to crystallize the product is from about 16 hours to about 36 hours. Further details may be found in the application by Gregory J. Lewis, "Crystalline Manganese Phosphate Compositions," Ser. No. 08/787,986, filed Aug. 23, 1996.

The manganese(IV)-containing oxides may be used either as the pure oxide, i.e., as manganese dioxide, as cryptomelane or as pharmacosiderite, or as a supported material. When used without a support, the manganese(IV)-containing oxide may be used as spheres, pills, pellets, granules, or other particles of uniform or regular shape. Manganese also may be formed into whatever shape is desirable with suitable binders, as is well known in the art. The manganese(IV)-containing oxides used as a catalyst in the practice of our invention also may be absorbed or impregnated on a solid adsorbent support in any conventional or otherwise convenient manner. The support or carrier material also may be in the form of spheres, pills, pellets, granules, or other particles whether of uniform or irregular shape. Supports which may be used in the practice of this invention can be any of the well known adsorbent materials generally utilized as a catalyst support or carrier material. Among those are included graphite and the various charcoals produced by the destructive distillation of wood, peat, lignite, nut shells, bones, and other carbonaceous matter, and preferably such charcoals as have been heat-treated or chemically treated or both, to form a highly porous particle structure of increased adsorbent capacity, and generally defined as activated carbon or charcoal. Said adsorbent materials also include the naturally occurring or synthetic zeolitic and molecular sieve materials generally and also the naturally occurring or synthetically prepared refractory inorganic oxides such as alumina, silica, zirconia, thoria, boria, etc., or combinations thereof.

Our process oxidizes cyanide at a pH between about 0.5 up to about 8 where $MnO_2$ itself is the catalyst, although generally it is practiced at a pH between about 2 and about 6. Where the manganese is in the form of cryptomelane or a related cation-stabilized structure or pharmacosiderite our process can be performed at a pH between 0.5 and about 12, usually between about 2 and about 10. Frequently the cyanide-containing aqueous streams will initially be acidic and can be oxidized directly without pH adjustment. In other cases, especially those where the cyanide is a tightly bound complex, the aqueous stream must be acidified prior to oxidative treatment. In such cases the acid used for acidification does not have any substantial effect on the invention, and any suitable acid may be chosen. Mineral acids, especially sulfuric and hydrochloric acids, are the most common acids employed.

Although the invention as described may be practiced at a quite low pH, disadvantages, accrue from materials corrosion and metal leaching from the support and even chemical degradation of some supports. Hence there are benefits from performing the reaction in a buffered solution which tends to maintain the system at a moderate pH, e.g., above about pH 3. The nature of the buffer is quite immaterial so long as it is itself not oxidized under reaction conditions and does not chemically interfere with cyanide oxidation. Suitable buffers may be based on, e.g., phosphates, acetates, carboxylates generally, borates, carbonates, and so forth. It may be well to mention that since both $CO_2$ and $NH_4+$ are reaction products there will be substantial internal buffering occurring as the reaction proceeds. This is yet another benefit flowing from our invention.

The process which is our invention can be designed to operate satisfactorily under ambient conditions of temperature and pressure, but this is not to say that these are the only conditions under which the process can be suitably practiced, or even that these are preferable reaction conditions for the oxidation of cyanide by oxygen in the presence of the manganese(IV)-containing oxides of this invention. In fact, one of the strengths of our invention is that it can be utilized under a very wide range of conditions. Thus, as to reaction temperature, temperatures may be as low as about 15° C. and as high as about 250° C. If the reaction is conducted at 1 atmosphere pressure, one is limited to an upper temperature of about 95° C. for aqueous systems because of the increased vapor pressure arising from water. On the other hand, if one is willing to operate at a higher pressure, or if other considerations make it desirable to operate at a higher pressure, then temperatures in excess of 95° C. may be used. It is certainly hue that the higher the reaction temperature the faster the cyanide oxidation will proceed. Similarly, the higher the partial pressure of oxygen—assuming its use as the sole oxidant—the faster will the reaction proceed. Consequently there are some advantages to working at partial pressures of oxygen higher than 0.2 atmosphere (the partial pressure of oxygen in air at atmospheric pressure) and at as high a temperature as possible under the reaction pressures employed. As a practical matter, it is believed that temperatures in excess of about 250° C. and total pressures in excess of about 20 atmospheres (oxygen partial pressure of 4 atmospheres) will prove only marginally beneficial and it may be more likely that the invention is practiced at temperatures up to about 150° C. In summary, our invention may be practiced within the pH range 0.5–12 at temperatures between 15° and 250° C. (or higher) and at oxygen partial pressures of 0.2 to 5 atmospheres (2.9–75 psi; 20–517 kPa).

It is also possible to practice our invention using either a flowing oxygen-containing gas stream or by presaturating the feed stream with oxygen and then oxidizing the saturated feed stream. In the first variant the reactants are in a two-phase system, and in the second variant the reactants are in a single-phase system. The variant where there is a flowing oxygen-containing gas stream presents the advantage that oxygen always can be present in great excess, although not in solution with the cyanide. Accordingly, some phase transport problems may arise. In the variant where all the oxygen is present in the feed stream oxygen transport is easier but the extent of cyanide oxidation, the rate of cyanide oxidation, or both, may be limited by the concentration of dissolved oxygen. Which variant is chosen is largely a matter of design choice.

As previously mentioned, the preferred oxidizing agent is oxygen, whether from air or from an oxygen-enriched gas. Other oxidants also may be used, in particular hydrogen peroxide and ozone, but these are not seen to be as generally convenient as that of oxygen and may be better employed under basic conditions. Where the cyanide content of the aqueous stream is no more than about 15 ppm, one can readily use air at atmospheric pressure as the source of oxygen, for under these conditions the level of dissolved oxygen will be sufficient for the concentration of cyanide present. On the other hand, one can go to higher pressures to effect higher concentrations of dissolved oxygen. However, we have found it more effective to continually bubble oxygen through the cyanide-laden aqueous stream in the reaction zone in order to provide sufficient oxygen for oxidation of cyanide at levels considerably higher than 15 ppm. Adequate dispersal of oxygen in the aqueous feedstock in contact with the catalyst is of considerable importance, but since appropriate methods of dispersal are well known in the art these will not be further discussed. Where a peroxide, such as hydrogen peroxide, is used as the oxidizing agent it can be conveniently added to the feedstock in an amount adequate to completely oxidize the cyanide present.

Although it is believed that temperature, oxidant concentration, and pH are the most important variables in the practice of our invention, other factors such as residence time, concentration of metal cations such as potassium, cyanide concentration, and nature of the cyanide (free or complexed inorganic cyanide; organic cyanide) constitute other process variables which the skilled worker will readily adapt to. As the data within show, the process variables can be changed over a rather broad range to affect the mount of cyanide oxidized. No inviolate rules can be stated for the degree of cyanide which should be removed; our previous comments showed no standard was applicable to all feedstocks and discharges. One desirable characteristic of our process is that removal of 90% of the cyanide is routine, removal of 95% is not difficult, and removal of greater than 98% is well within process capabilities, with removal to the extent of 99.5 percent frequently quite desirable.

EXAMPLE 1

Continuous Remediation

A reactor was packed with 25 g of electrolytically deposited manganese dioxide (obtained from Chemetals) thoroughly mixed with 150 g of sand. The feedstock was an aqueous solution containing 69 ppm of inorganic cyanide at pH 2.5, 250 ppm acetonitrile, and 100 ppm propionitrile. The cyanide-containing solution was passed downflow over the catalyst at a liquid hourly space velocity between 0.5 and 3.0 with temperatures varying between 75° and 150° C. Air was used as the oxidant at a pressure of 75 psig with a bleed rate of 0.5 SCF per hour. Effluent was analyzed for residual inorganic cyanide and separately for nitriles. Analyses showed that at a temperature of 105° C. there was less than 1 ppm inorganic cyanide in the effluent throughout the LHSV range tested. At 75° C., up to an LHSV of about 0.6 there was not more than about 1 ppm inorganic cyanide in the effluent. The concentrations of nitriles in the effluent are summarized in Table 1 which follows.

TABLE 1

| Nitrile Concentration (in ppm) in Effluent | | | |
|---|---|---|---|
| | 75° C., 0.6 LHSV | 125° C., 2 LHSV | 150° C., 2 LHSV |
| Acetonitrile | 210 | 100 | 75 |
| Propionitrile | <10 | 0 | <10 |

EXAMPLE 2

Oxidations Using Cryptomelane and Manganese Phosphate Pharmacosiderite

Cryptomelane may be prepared according to the literature; the sample used had an analysis of $K_{1.12}Mn_{8.00}O_{15.92} \cdot 0.5H_2O$ and was prepared as follows. $KMnO_4$ (1050 g) was suspended in 14000 g distilled water in a 22-liter flask equipped with a motorized stirrer and reflux condenser. Glacial Acetic Acid (1196 g) was added to the stirring suspension and the resulting mixture was heated to reflux for 2 days, during which the initially dark purple solution became a suspended brown solid. The solid product was filtered, washed with distilled water and dried at room temperature. X-ray diffraction (XRD) analysis showed the product to be isostructural with the hollandite structure, more specifically the potassium form cryptomelane. Scanning Electron Microscopy (SEM)/Energy Dispersive Analysis by X-rays (EDAX) showed the product to consist of uniform fiber-like crystals containing the metals K and Mn. Elemental analysis showed the metals to be present in the mole ratios $K_{1.12}Mn_{8.00}$, consistent with the formulation for the hollandite structure.

The manganese phosphate with a pharmacosiderite structure was prepared as described below. Oxidations were performed as batch reactions using 1 g of either of the foregoing as catalyst, 20 g of a feedstock containing 100 ppm potassium cyanide at pH 10.3 under 1,000 psig of air at 125° C. After 4 hours each of the foregoing catalysts effected 100% conversion; less than 0.1 ppm of cyanide could be detected. The preparation of the manganese phosphate was carried out using a stock solution containing 1 wt. % manganese (0.2M) referred to herein as the "1% Solution". The high concentration and stability of the 1% solution makes it a preferred material for preparing the manganese phosphate compositions.

In a 12 liter round bottom flask equipped with a mechanical stirrer and a dropping funnel there was added 5800 g of distilled water followed by 1802 g of concentrated (85.7 wt %) $H_3PO_4$ and 250 g of $NaMnO_4 \cdot H_2O$ to give a dark purple solution. In a separate container 159.44 g of $NaHCO_2$ was dissolved in 576 g distilled water. This solution was placed in a dropping funnel and added dropwise to the stirring $NaMnO_4/H_3PO_4$ solution. The resultant mixture became a black-brown color over the course of the addition. Upon completion of the addition, the mixture was stirred for three to five days and then filtered on a buchner funnel. The filtered solution was analyzed and found to contain 1.0±0.1 wt. % Mn and the manganese had an average oxidation state of 3.85. This solution was identified as "1% Solution".

In a container was placed 500 g of "1% Solution" and to it was added dropwise an aqueous base solution (46.5 g KOH in 139.4 g water) to adjust the pH and the resultant mixture was stirred for 15 minutes to 1 hour. To the mixture there was added 7.43 g $KNO_3$ (the templating agent) as a solid and the mixture was stirred for 45 minutes to 2 hours. The resulting mixture was placed in a Teflon® bottle or Teflon®-lined autoclave and digested for 16 hrs. at a temperature of 100° C. at autogenous pressure. The resultant solid product was recovered by filtration and washed with distilled water. The product was dried at room temperature.

Analytical data gave the composition as $Na_{0.07} K_{2.37} Mn_{4.0} P_{2.63} O_{15.14}$, where Mn has an oxidation state of 3.67. X-ray diffraction data showed it to have the pharmacosiderite structure.

EXAMPLE 3

Manganese Dioxide as a Catalyst in Nitrile Disappearance

This experiment was performed to show that in fact the disappearance of dissolved nitrile from aqueous solutions is catalyzed by the presence of manganese dioxide. The first two entries in the table below represent batch reactions in the absence of manganese/dioxide, whereas the third entry represents results in a downflow reactor over manganese dioxide similar to that described in Example 1. All reactions were conducted at 75° C.

TABLE 2

| Loss of Dissolved Nitrile from Aqueous Solutions. | | | | |
|---|---|---|---|---|
| Feed | pH | Time (hrs) | Air Pressure (psig) | Weight Percent Nitrile Lost |
| 50% Acetonitrile | 2.5 | 0.3 | Ambient | 0.8 |
| 302 ppm Acetonitrile | 2.5 | 0.3 | Ambient | 1.3 |
| 252 ppm Acetonitrile | 2.6 | 3.3 (0.3 LHSV) | 75 | 100 |

The foregoing data show conclusively that manganese dioxide catalyzes the disappearance of nitrile. We were unable to conclusively demonstrate whether the loss of nitrile occurred via oxidation or hydrolysis.

What is claimed is:

1. A process of reducing the concentration of cyanide-containing compounds dissolved in an aqueous stream comprising contacting a stream containing at least one dissolved cyanide-containing compound with an oxidizing agent selected from the group consisting of oxygen, ozone, and hydrogen peroxide in the presence of a catalytically effective amount of a crystalline manganese phosphate composition at oxidation conditions, wherein said oxidizing conditions include a temperature between about 15° and about 250° C., said crystalline manganese phosphate composition having an extended network and an empirical composition on an anhydrous basis expressed by an empirical formula of:

$$(A^{a+})_v(Mn^{b+})(M^{c+})_xP_yO_z$$

where A is a templating agent selected from the group consisting of alkali metals, alkaline earth metals, hydronium ion, ammonium ion, organoammonium ions, and mixtures thereof, "a" represents a weighted average valence of A and varies from 1.0 to 2.0, "v" is the mole ratio of A to Mn and varies from about 0.1 to about 5, "b" is the average valence of Mn and has a value of greater than 3 to about 4, M is a metal selected from the group consisting of Al, $Fe^{3+}$, Ga, $Sn^{4+}$, Ti, $Sb^{5+}$, and mixtures thereof, "x" is the mole ratio of M to Mn and varies from 0 to about 3.0, "c" is the weighted average valence of M and varies from about 1.0 to about 5.0, "y" is the mole ratio of P to Mn and varies from about 0.10 to about 5.0 and "z" is the mole ratio of O to Mn and has a value determined by the equation

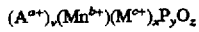

$$z=\tfrac{1}{2}(av+b+xxc+5xy).$$

2. The process of claim 1 where the cyanide-containing compound dissolved in said stream is an inorganic cyanide, an organic nitrile, or any combination thereof.

3. The process of claim 2 where the organic nitrile is selected from the group consisting of acrylonitrile, acetonitrile, propionitrile, and 4-cyanopyridine.

4. The process of claim 1 where and said oxidation conditions include a pH between about 0.5 and about 12.

5. The process of claim 4 where the pH is between about 2 and about 10.

6. The process of claim 1 where the oxidizing agent is oxygen.

7. The process of claim 6 where the oxygen partial pressure is between about 0.2 and about 5 atmospheres.

8. The process of claim 1 where the cyanide concentration is reduced by at least 90 percent.

9. The process of claim 8 where the cyanide concentration is reduced by at least 95 percent.

10. The process of claim 9 where the cyanide concentration is reduced by at least 98 percent.

11. The process of claim 10 where the cyanide concentration is reduced by at least 99.5 percent.

* * * * *